INVENTOR
Emil H. Balz

Dec. 15, 1936.  E. H. BALZ  2,064,514
APPARATUS FOR MAKING SAFETY GLASS
Filed Aug. 3, 1933  3 Sheets-Sheet 2

INVENTOR
Emil H. Balz
By
Bradley + Bee
attys

Dec. 15, 1936.  E. H. BALZ  2,064,514
APPARATUS FOR MAKING SAFETY GLASS
Filed Aug. 3, 1933  3 Sheets-Sheet 3

INVENTOR
Emil H. Balz
by
Bradley & Bee
attys

Patented Dec. 15, 1936

2,064,514

UNITED STATES PATENT OFFICE 2,064,514

APPARATUS FOR MAKING SAFETY GLASS

Emil H. Balz, Glenshaw, Pa., assignor to Duplate Corporation, a corporation of Delaware Application August 3, 1933, Serial No. 683,470

5 Claims. (Cl. 49—81)

Figure 1:
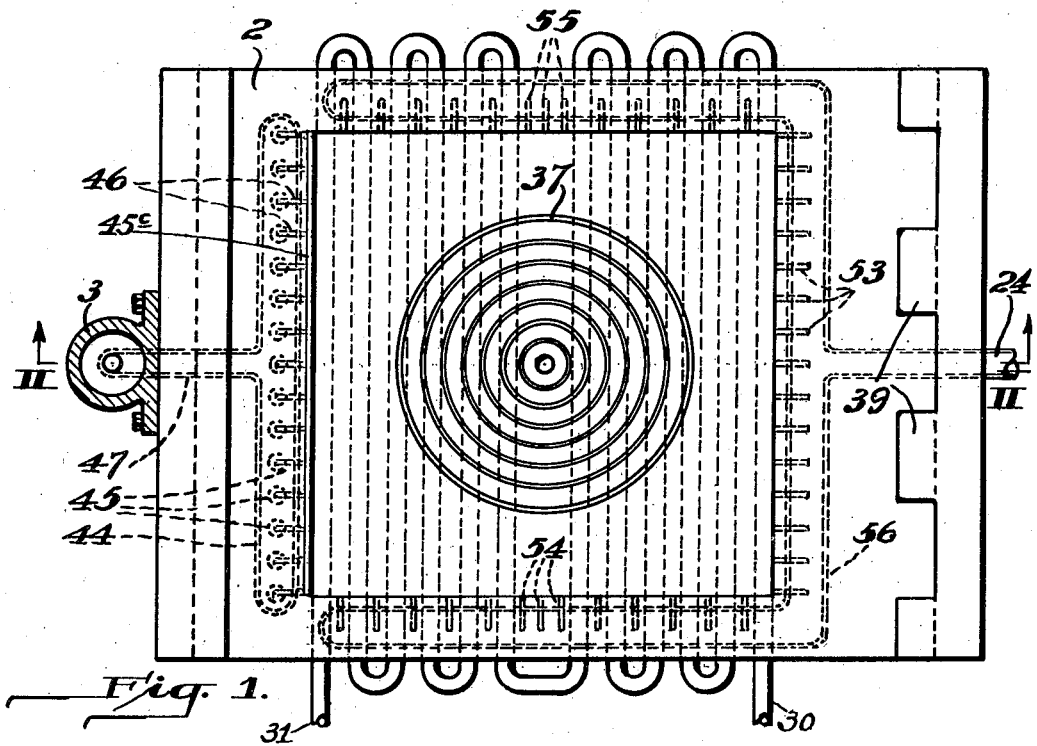
Figures 4, 5:
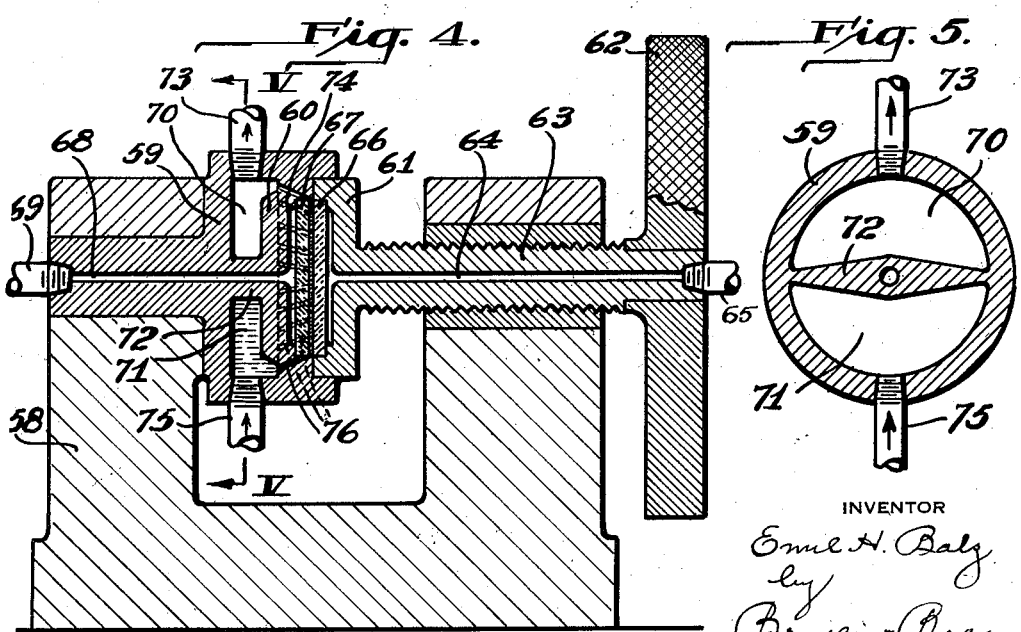
Figure 2:
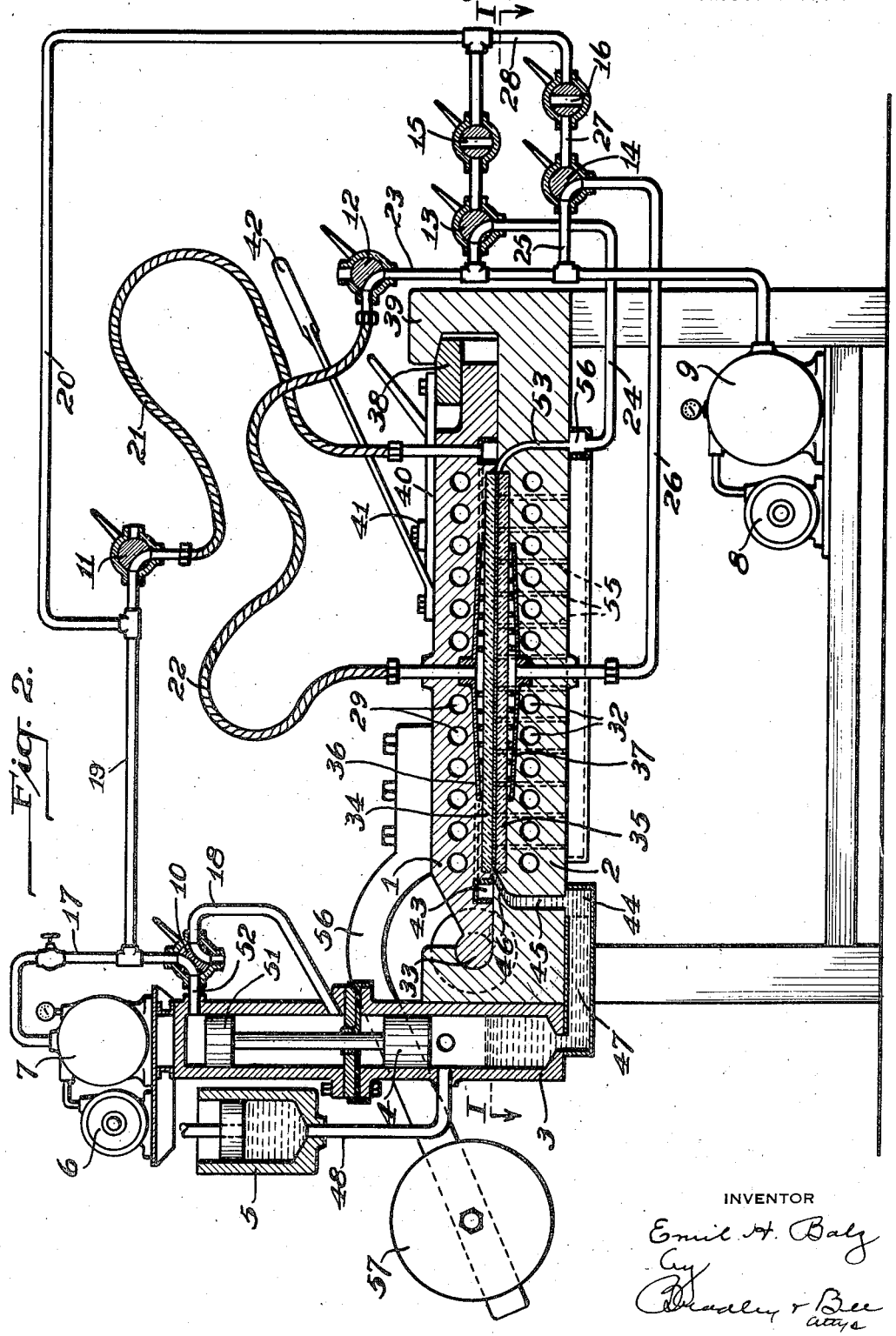
Figure 3:
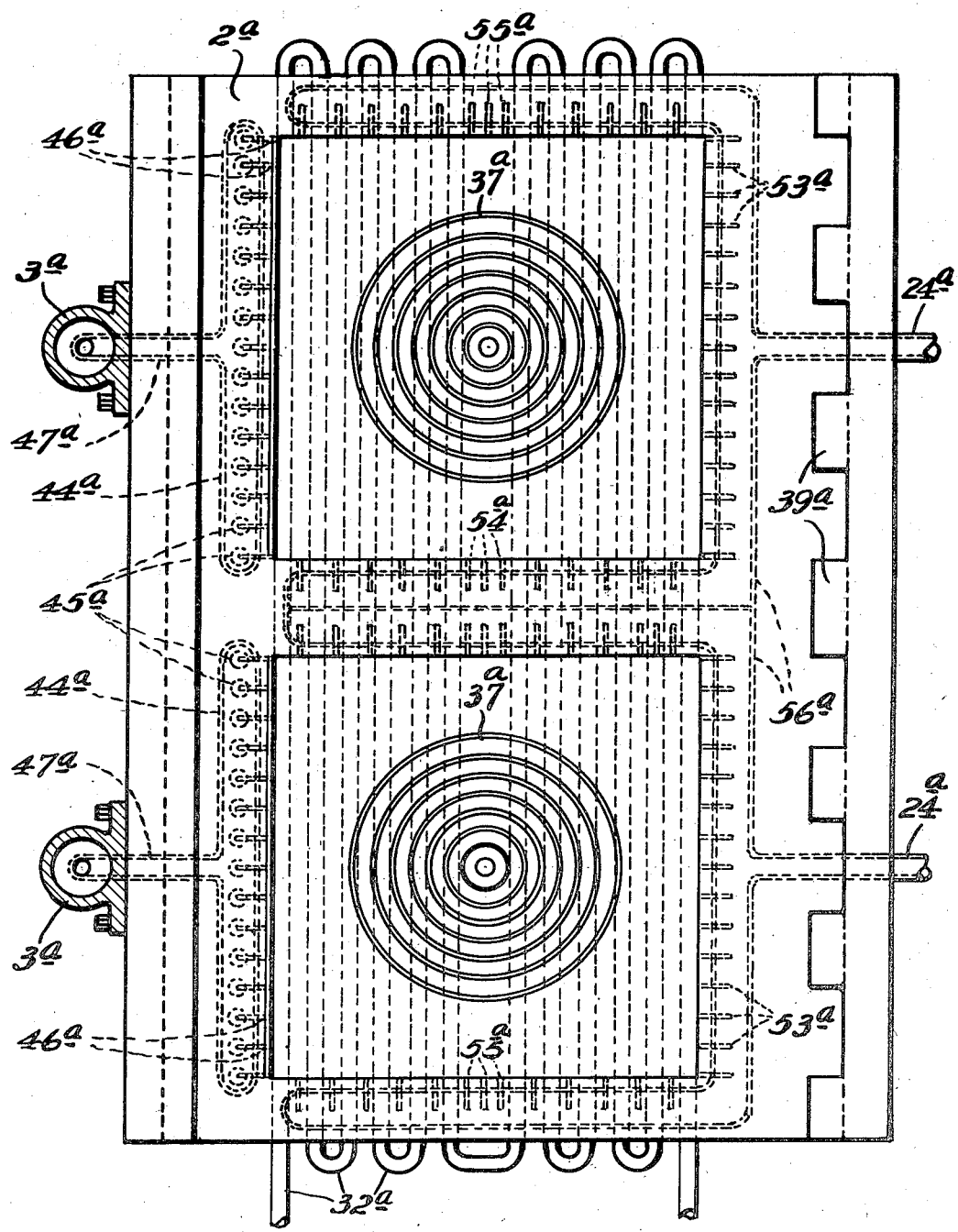

The invention relates to an apparatus for making safety glass, which glass ordinarily consists of two sheets of plate or window glass with an interposed reinforcing layer of tough material to which the surfaces of the glass sheets are adhered. The invention has for its principal objects the provision of an improved apparatus for applying the layer of reinforcing material in plastic condition between the glass sheets, which may be one of the various cellulose plastic materials (such as cellulose nitrate, cellulose acetate, or ethyl cellulose), or may be one of the resins (such as vinylite, glyptol, or phenol formaldehyde condensation products). Further objects of the invention are the provision of improved means for insuring a proper distribution of the reinforcing material between the glass sheets, and the avoidance of bubbles, and the provision of improved means for supporting the glass sheets in spaced relation while the reinforcing material is being forced therebetween. Certain embodiments of the apparatus are shown in the accompanying drawings, wherein:

Figure 1 is a plan view on the line I—I of Fig. 2. Fig. 2 is a section on the line II—II of Fig. 1. Fig. 3 is a plan view, partially in section, of a modification. And Figs. 4 and 5 show another modification, Fig. 4 being a vertical section, and Fig. 5 a partial section on the line V—V of Fig. 4.

Referring first to the construction of Figs. 1 and 2, 1 and 2 are upper and lower platens respectively between which the glass and plastic are composited; 3 is a pressure cylinder provided with a piston 4 by means of which the plastic material in measured quantity is supplied to the pressure cylinder 3; 6 is an air compressor for supplying compressed air to the tank 7 for operating the plunger 4; 8 is a vacuum pump by means of which air is exhausted from the tank 9; 10 is a three-way valve; 11, 12, 13, and 14 are two-way valves; 15 and 16 are one-way valves; and 17 to 28, incl. are pipe connections whose function will be later pointed out, the pipes 21 and 22 being of flexible material to accommodate themselves to the movement of the upper platen 1.

The upper platen 1 is provided with passages 29 connected at their ends through which steam may be supplied for heating the platen, this being accomplished by means of the pipe connections 30 and 31 (Fig. 1). The lower platen 2 is similarly provided with connected passages 32 by means of which steam may be supplied through the platen for heating it, the purpose of the heating being to facilitate the flow of the plastic material between the glass sheets carried by the platens, as later described.

The upper platen 1 is pivoted to the lower platen, as indicated at 33 (Fig. 1), in order to permit the upper platen to be opened for the application and removal of the glass sheets 34 and 35. The upper platen is provided with a vacuum holding cup 36, from which air is exhausted to hold the plate 34 by means of the pipe connections 22 and 23 leading to the vacuum tank 9 and controlled by the valve 12. The glass plate 25 is similarly held in the lower platen 2 by means of the vacuum cup 37 connected to the vacuum tank 9 by means of the pipe connections 26, 25, and 23, the application of vacuum being controlled by the valve 14. When vacuum is applied to the two cups, the glass sheets 34 and 35 are held securely in position in the platens spaced apart a distance equal to the layer of plastic which is to be applied between the sheets. The upper platen is locked in closed position by means of the latch 38 which is provided with notches and is slidable longitudinally below the notched retaining flange 39 integral with the platen 2. The latch is moved between locked and unlocked position by means of a lever 40 pivoted at 41 and operated by the handle 42. This type of retaining latch is shown in detail in the Sherts Patent No. 1,906,821 and is well known in the art. In order to release the vacuum on the cup 36, the valve 12 is swung through an angle of 90 degrees in a clockwise direction. In order to release the vacuum on the cup 37 and positively force the composited plate upward to release position, the valve 14 is swung in a counterclockwise direction 90 degrees and the valve 16 is opened so that air is supplied from the air tank 7 through the connections 17, 19, 20, 28 and 26. In order to provide a seal between the two platens, the pneumatic tube 43 is employed extending around the circumference of the recess carrying the glass plates and supplied with air under pressure from the tank 7 via the connections 17, 19 and 21 controlled by the valve 11.

A header 44 is provided along the lower side of the platen 2 having a plurality of upward and laterally extending passages 45 and 46 leading to a slot 45c extending along the edge of the space between the glass plates 34 and 35. The reinforcing plastic is supplied from the pressure cylinder 3 to the header 14 through the pipe 47. The pressure cylinder is supplied with plastic from the measuring cylinder 5 through the pipe 48 provided with a plunger 48a, the plastic being supplied to the cylinder 5 by removing the plunger therefrom. After the proper amount of plastic has been supplied to the cylinder 3, the plunger 4 is caused to move downward by supplying air above the piston 51, this being accomplished by turning the valve 10 to the position shown so that air is supplied from the tank 7 via the pipes 17 and 52. This causes the plastic to be forced from the cylinder 3 through the passages 47, 45 and 46, and between the glass plates 34 and 35. At the same time that the plastic material is thus supplied under pressure to one edge of the space between the glass plates, suction is applied at the other three edges of such space. This is accomplished by means of the three sets of passages 53, 54 and 55, all of which sets of passages are connected to the U-shaped header 56 secured to the lower side of the platen 2. Air is exhausted to the tank 9 by means of the pipe connections 23 and 24 controlled by the valve 13, which at this time occupies the position shown in Fig. 2. Vacuum is thus applied to three sides of the space between the glass plates until such space is completely filled with a plastic material and flows into the ends of the passages 53, 54, and 55. This insures that the space between the glass plates shall be completely filled with the plastic material. After the operation is completed and the composited plate is removed from between the platens, it is necessary to blow out any of the plastic material which has run into the ends of the passages 53, 54, 55, and this is accomplished by releasing the vacuum connection on the pipe 24 and applying air pressure to such pipe. In order to make the necessary connection for accomplishing this function, the valve 13 is moved in a counterclockwise direction through an angle of 90 degrees and the valve 15 is shifted through an angle of 90 degrees so that air is supplied under pressure to the pipe 24 via the pipes 17, 19, 20 and 24.

During the compositing operation, as above described, the platens are preferably heated to facilitate the flow of the plastic material and this is accomplished, as heretofore pointed out, by causing a flow of steam through the passages 29 and 32. After the operation is completed, the plunger 4 is returned to the position shown by shifting the valve 10 in a clockwise direction, through an angle of 90 degrees so that the pipe 52 is connected to the atmosphere and the pipe 17 is connected to the pipe 18, thus applying a pressure to the lower side of the piston 51. In order to facilitate the opening of the platen 1, it is counterweighted by means of the lever 56 carrying the weight 57.

Fig. 3 illustrates a modification which differs from that of Figs. 1 and 2 only in that provision is made for compositing two sets of sheets at one time, the platens being made correspondingly larger in order to accomplish this function. Two pressing cylinders 3a, 3a are employed instead of the single cylinder 3 of Fig. 1 and the platens are provided with two sets of vacuum holding cups 37a, 37a instead of the single holding cup 36 of Fig. 1. Similarly, the lower platen is provided with two sets of admission passages 45a, 45a, and two sets of exhaust passages 53a, 54a, and 55a. Aside from this matter of duplication, this construction is similar in all respects to that of Figs. 1 and 2.

Figs. 4 and 5 illustrate a modification designed particularly for making spectacle blanks. In this construction 58 is the base or framework; 59 is a member mounted therein and carrying a fixed platen 60, while 61 is a movable platen mounted on the stem 62 which is threaded through a flange on the member 58. The stem 62 is provided with a hand wheel 62 and with a passage 64, to which a vacuum pipe 65 is connected. The suction as applied through the passage 64 provides a means for holding the glass disc 66 in position and separated from the glass disc 67. The member 59 is also provided with a passage 68 connected to the vacuum pipe 69, thus providing a means for holding the glass disc 67 in the platen 60. The space behind the platen 60 is divided into two chambers 70 and 71 by a plate 72 (Fig. 5) and vacuum is applied to the space 70 by means of the vacuum connection 73. The space 70 is connected to the periphery of the space between the glass plates by means of the plurality of passages 74. Plastic material for filling the space between the glass discs is supplied by means of the pipe 75, and the space 71 is connected to the periphery of the space between the glass discs by means of the plurality of passages 76.

In operation, after the parts are positioned, as indicated in Fig. 4, plastic is applied under pressure to the chamber 71 and at the same time suction is applied to the chamber 70 so that the space between the glass discs is filled with the plastic reinforcing material. As heretofore pointed out, a large variety of plastic reinforcing materials may be employed containing varying proportions of resin or cellulose plastic mixed with suitable plasticizer and solvent. A specific example when a resin is employed is as follows:

|  | Parts |
| --- | --- |
| Vinyl chloracetate | 75 |
| Dibutyl phthalate | 25 |
| Acetone or chlorbenzol | 10 |

A further example when a cellulose plastic dope is employed is as follows:

|  | Parts |
| --- | --- |
| Cellulose acetate flake | 55 |
| Dimethyl phthalate | 45 |
| Ethyl alcohol | 8 |
| Acetone | 3 |

In preparing the mixtures, heating, kneading, or rolling may be employed to free the mixture from bubbles preliminary to its use in compositing as heretofore described.

What I claim is:

1. In combination in apparatus for making safety glass, a lower platen for supporting a glass sheet, an opposing upper platen movable to a position away from the lower platen, vacuum means carried by the upper platen for supporting a second glass sheet spaced from the first sheet, and means for supplying plastic reinforcing material under pressure into the space between the sheets at one edge thereof.

2. In combination in apparatus for making safety glass, a pair of opposing platens in parallel, one of which is movable away from the other, vacuum means on each platen for supporting a sheet of glass so that when the platens are in closed position the glass plates are spaced apart to provide a space for reinforcing material, and means for forcing plastic reinforcing material under pressure into said space at one edge thereof.

3. In combination in apparatus for making safety glass, a lower platen for supporting a glass sheet, an opposing upper platen movable to a position away from the lower platen, vacuum means carried by the upper platen for supporting a second glass sheet spaced from the first sheet, means for supplying plastic reinforcing material under pressure into the space between the sheets at one edge thereof, and means for applying air pressure to the vacuum means to release the glass sheet held thereby.

4. In combination in apparatus for making safety glass, a pair of opposing platens in parallel, one of which is movable away from the other, vacuum means on each platen for supporting a sheet of glass so that when the platens are in closed position the glass plates are spaced apart to provide a space for reinforcing material, means for forcing plastic material under pressure into said space at one edge thereof, and means for applying air under pressure to one of said vacuum means to release the sheet held thereby.

5. In combination in apparatus for making safety glass, a pair of opposing platens in parallel, one of which is movable away from the other, vacuum means on each platen for supporting a sheet of glass so that when the platens are in closed position the glass plates are spaced apart to provide a space for reinforcing material, means for forcing plastic material under pressure into said space at one edge thereof, and means for applying air under pressure to said vacuum means to release the sheets held thereby.

EMIL H. BALZ.